United States Patent
Zaehe

(10) Patent No.: US 9,850,919 B2
(45) Date of Patent: Dec. 26, 2017

(54) COUNTERBALANCE VALVE WITH DUAL OR TRIPLE PILOT RATIO

(71) Applicant: Sun Hydraulics Corporation, Sarasota, FL (US)

(72) Inventor: Bernd Zaehe, Erkelenz (DE)

(73) Assignee: SUN HYDRAULICS CORPORATION, Sarasota, FL (US)

( * ) Notice: Subject to any disclaimer, the term of this patent is extended or adjusted under 35 U.S.C. 154(b) by 108 days.

(21) Appl. No.: 14/854,868

(22) Filed: Sep. 15, 2015

(65) Prior Publication Data

US 2016/0076557 A1 Mar. 17, 2016

Related U.S. Application Data

(60) Provisional application No. 62/051,121, filed on Sep. 16, 2014.

(51) Int. Cl.
| | |
|---|---|
| F15B 13/01 | (2006.01) |
| G05D 16/10 | (2006.01) |
| F15B 13/02 | (2006.01) |
| F16K 17/06 | (2006.01) |

(52) U.S. Cl.
CPC .......... F15B 13/015 (2013.01); F15B 13/029 (2013.01); F16K 17/065 (2013.01); G05D 16/10 (2013.01)

(58) Field of Classification Search
CPC ..... F15B 13/015; F15B 13/029; G05D 16/10; F16K 17/065
See application file for complete search history.

(56) References Cited

U.S. PATENT DOCUMENTS

| | | | |
|---|---|---|---|
| 3,568,082 A | 6/1971 | Muller | |
| 3,621,881 A | 11/1971 | Vicari | |
| 3,863,672 A | 2/1975 | Theriot et al. | |
| 4,084,613 A | 4/1978 | Peters | |
| 4,248,265 A * | 2/1981 | Freeman, Jr. ......... | E21B 33/068 137/494 |
| 4,275,758 A | 6/1981 | Masuda | |

(Continued)

FOREIGN PATENT DOCUMENTS

| | | |
|---|---|---|
| DE | 3318246 A1 | 11/1984 |
| DE | 102008058589 A1 | 5/2010 |

(Continued)

OTHER PUBLICATIONS

International Search Report and Written Opinion in International Application No. PCT/US2015/050363, European Patent Office, dated Dec. 17, 2015 (15 pages).

(Continued)

*Primary Examiner* — Jessica Cahill
*Assistant Examiner* — Daphne M Barry
(74) *Attorney, Agent, or Firm* — Brinks Gilson & Lione

(57) ABSTRACT

Novel Counterbalance valves, more particularly, to counterbalance valves that provide hold, capture, and motion control benefits of prior art CB valves while improving upon one or more performance characteristics of current CB valves are herein disclosed. The novel counterbalance valves are useful, inter alia, for providing good system stability across a range of load pressures and/or reducing power consumption (improving energy efficiencies) as compared with prior art devices.

12 Claims, 20 Drawing Sheets

(56) References Cited

U.S. PATENT DOCUMENTS

| | | |
|---|---|---|
| 4,336,826 A | 6/1982 | Grawunde |
| 4,338,856 A | 7/1982 | Smilges et al. |
| 4,742,846 A | 5/1988 | DiBartolo |
| 4,834,135 A | 5/1989 | DiBartolo |
| 5,050,636 A | 9/1991 | Sagawa et al. |
| 5,381,823 A | 1/1995 | DiBartolo |
| 6,119,722 A | 9/2000 | Zaehe |
| 6,378,557 B2 | 4/2002 | Kawamura et al. |
| 6,581,630 B1 | 6/2003 | Kaneko |
| 6,640,830 B2 | 11/2003 | Zaehe |
| 7,467,642 B2 | 12/2008 | Prinsen et al. |
| 2013/0233409 A1 | 9/2013 | Grawunde |

FOREIGN PATENT DOCUMENTS

| | | |
|---|---|---|
| EP | 2407694 A2 | 1/2012 |
| WO | 03042587 A1 | 5/2003 |

OTHER PUBLICATIONS

"Model MWIG-LHN, Vented 4.5:1 Pilot Ratio, Load Reactive Load Control Valve", Sun Hydraulics, accessed from snhy.com/mwig-lhn, accessed on Jan. 13, 2014.

\* cited by examiner

Cross-Sectional Side View of a Prior Art, three-port Counterbalnce Valve

Cross-Sectional Side View of a Prior Art, three-port Counterbalnce Valve

Standard Counterbalance Valve at Four Different Constant Flows

Exemplary Triple Pilot Valve at Four Different Constant Flows

COUNTERBALANCE VALVE WITH DUAL OR TRIPLE PILOT RATIO

CROSS REFERENCE TO RELATED APPLICATIONS

The present application claims benefit of priority thereto under 35 U.S.C. Section 119(a-d) to U.S. Provisional Application No 62/051,121 filed Sep. 16, 2014, the disclosure of which is hereby incorporated herein by reference in its entirety.

FIELD OF THE INVENTION

This invention relates to the field of counterbalance, load control, motion control and overcenter valves.

BACKGROUND

Prior Art CounterBalance Valves

Counterbalance (CB) valves are applied in various hydraulic circuits and are used to hold, capture, or control the motion of loads. Essentially, CB valves are modulating devices that allow free flow from an inlet valve port to a load port and then block reverse flow until a load pressure, pilot pressure, or combination of load and pilot pressure open the valve. Modern CB valves control loads and minimize instability (e.g., chattering) in machines. As a result, CB valves are frequently incorporated in positioning circuits, load-holding and purging circuits, and regenerative circuits. Examples of machines that utilize CB valves are boom lifts, forklifts, industrial drills, and excavators, among many other machines.

The modulation of conventional CB valves is a function of both load pressure and pilot pressure. This characteristic ensures loads must be driven from a fluid power source, even when loads are overrunning. FIG. 3 graphically depicts how pilot pressure decreases as load pressures increases. In particular, the graph of FIG. 3 illustrates a prior art CB valve in which pilot pressure I changes as load pressure II rises steadily with time to a predetermined maximum setting III. On the other hand, pilot pressure would rise if load pressure fell steadily over time.

FIG. 1 illustrates a prior art, three port, pilot-to-open CB valve 1001 having a valve body 1038, a load port 1004, a valve port 1008, and a pilot port 1012. In operation, CB valve 1001 serves as a counterbalance and holds a load at load port 1004. If the load pressure applied at load port 1004 exceeds the spring force created by springs 1020, then piston 1032 moves axially to compress springs 1020. Such axial movement of the piston to an open position creates a flow path between load port 1004 and valve port 1008, or put differently, it provides a relief function. Because having only a relief function is inefficient, a pilot function is also provided. The pilot function allows a user to apply pilot pressure to open a flow path between the load port 1004 and the valve port 1008. As a result, pressure at either the load port or the pilot port can be used to open a flow path between the load port and the valve port. A combination of pressure at the load port and the pilot port will also open a flow path.

Traditional CB valves have a fixed or adjustable setting. Fixed setting valves are typically set by the manufacturer and are not adjustable. Adjustable CB valves feature adjustment screws so the setting can be changed in the field. While settings can be set in the field, settings are not typically changed when the valves are being operated. CB valves with adjustment screws are illustrated in FIGS. 1 and 2. Adjusting CB valves generally involves rotating adjusting screw 1024 when the CB valve is not in operation. Rotating adjusting screw 1024 changes the compression of springs 1020, thus changing the setting of the CB valve. More specifically, when springs 1020 are in an uncompressed position, the CB valve allows piston 1032 to slide to an open position at a low load pressure. In contrast, when the springs are adjusted to a compressed position, a greater load pressure is necessary to move the piston to an open position.

FIG. 2 illustrates a prior art, four port, pilot-to-open CB valve 1036. CB valve 1036 is vented to eliminate the effect back pressure on the valve port has on the operation of the valve. In particular, CB valve 1036 is provided with drain or vent port 1016 that eliminates sensitivity to back pressure.

Drawbacks of Prior Art Counterbalance Valves

Although CB valves have highly desirable qualities in the hold, capture, and motion control of loads in hydraulic circuits, CB valves also have drawbacks. CB valves must be set for the maximum load that a machine must control. One significant drawback is increased energy consumption in machines that utilize conventional CB valves, when load pressures vary significantly over the operating cycle. Another drawback is increased wear in machines and machine components when high pilot pressures are frequently needed to control light loads. Although energy efficiency and wear and tear have long been important considerations in machine design, the current economic, environmental, and political atmosphere has led to an extraordinary demand for innovations that improve efficiency and longevity of machines, including machines that incorporate CB valves.

Both increased energy consumption and wear of machines operating with traditional CB valves are owed, at least in part, to CB setting and pilot ratio. First, for control and safety purposes, to maintain control of maximum anticipated loads, CB valves are typically set above the maximum load pressure that could be generated. In many machines, however, maximum loads may be encountered infrequently. That is, the majority of time during which a CB valve is in operation, the load pressure is some amount less than the CB setting. During that time, an increase in pilot pressure is necessary to compensate for the difference between the valve setting and the load pressure. Second, and of significant importance, up to half of the working cycle of many CB valves is dedicated to the control of nominal loads, where machines are unloaded. This means that for up to half of its working cycle, and sometimes more, a CB valve may require use of full or high pilot pressure.

By way of example, a forklift may be used to raise a full pallet, where it is unloaded and then lowered completely empty. Lowering the empty fork typically requires high pilot pressure. Generating high pilot pressure, of course, necessitates the use of high horsepower and energy. In a forklift, significant pilot pressure, and energy, may be required when lowering any load less than a full load.

CB valve adjustments to improve stability of load circuit typically adversely affect energy efficiencies of the machine. Conversely, adjustments to improve energy efficiencies raise the likelihood that increased instabilities in the circuit will occur, especially at elevated external load pressures.

For example, when the directional or proportional valve is opened to move the cylinder, the inlet pressure opens the counterbalance valve on the outlet of the cylinder. At high load pressures, the counterbalance valve setting may fall too far, setting off an oscillation in the circuit ("chirping"). The typical remedy to this circuit behavior is to employ valves with a lower pilot ratio. However, the disadvantage of the lower pilot ratio is that an increased pilot pressure is required to move the cylinder. Routinely running at higher pressures means higher energy consumption. Any attempts to increase pilot ratio will raise the potential for instability at higher load. Thus, the selection of counterbalance valves represents a compromise between stability (low pilot ratio) and efficiency (lower required pilot pressure, high pilot ratio).

More recent counterbalance valves, such as those reported in US Patent Application Publication No. 2013/0233409, are provided with load-sensing, hydromechanically setting features. The valve relief setting changes dynamically based on the load pressure at the load port of the counterbalance valve. US Patent Application Publication No. 2013/0233409 is hereby incorporated herein by reference in its entirety.

As a result, there is a real need for devices that provide the hold, capture, and motion control benefits of current CB valves while improving upon one or more performance characteristics of current CB valves. There is also a need for devices that provide good system stability across a range of load pressures while reducing power consumption (improving energy efficiencies) as compared with prior art devices. The invention is directed to these and other important ends.

BRIEF SUMMARY

One or more of the preceding drawbacks of currently available CB valves are improved, and an advance is made in the art by a novel counterbalance valve. According to one aspect of the present invention, a CB valve is provided that reduces the likelihood of oscillation instabilities in the hydraulic circuit under high load conditions while reducing overall energy consumption at lower loads.

According to another aspect of the present invention, a counterbalance valve is provided that operates with a low gradient when load pressure is high and pilot pressure is low.

According to another aspect of the present invention, a counterbalance valve is provided that operates with a high gradient when load pressure is low and pilot pressure is high.

According to another aspect of the present invention, a counterbalance valve is provided that operates with a low gradient when load pressure is high and pilot pressure is low and operates with a high gradient when load pressure is low and pilot pressure is high.

According to yet another aspect of the present invention, the CB valve preload is adjustable over a range of load conditions.

According to yet another aspect of the present invention, the CB valve has an inner spring and an outer spring, wherein preload on both springs is adjustable.

According to another aspect of the invention, the counterbalance valve includes a pilot sleeve that assists the main piston spacer in compressing the inner spring when pilot pressure exceeds outer spring preload.

According to another aspect of the invention, the counterbalance valve has a further reduced setting of the valve by a fixed pressure when pilot pressures are very low without movement of the load.

Advantages of herein disclosed valves over existing CB valves may include their adjustability resulting in higher overall efficiency, reduced exposure of seals to load pressure that can result in lower seal failure rates, flatter relief curves, smaller outer diameters for valve housing and/or less expensive parts.

DETAILED DESCRIPTION

Figure 1:
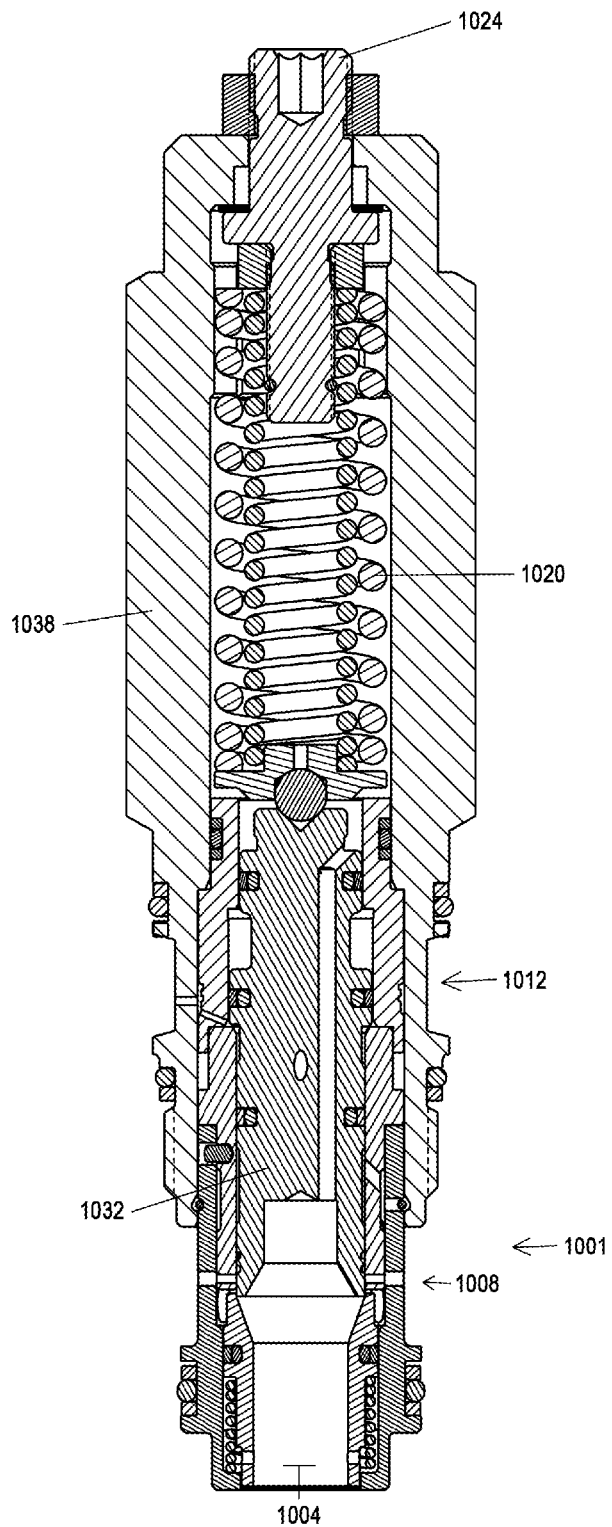
FIG. 1 illustrates a cross-sectional side view of a prior art, three-port counterbalance valve.
Figure 2:
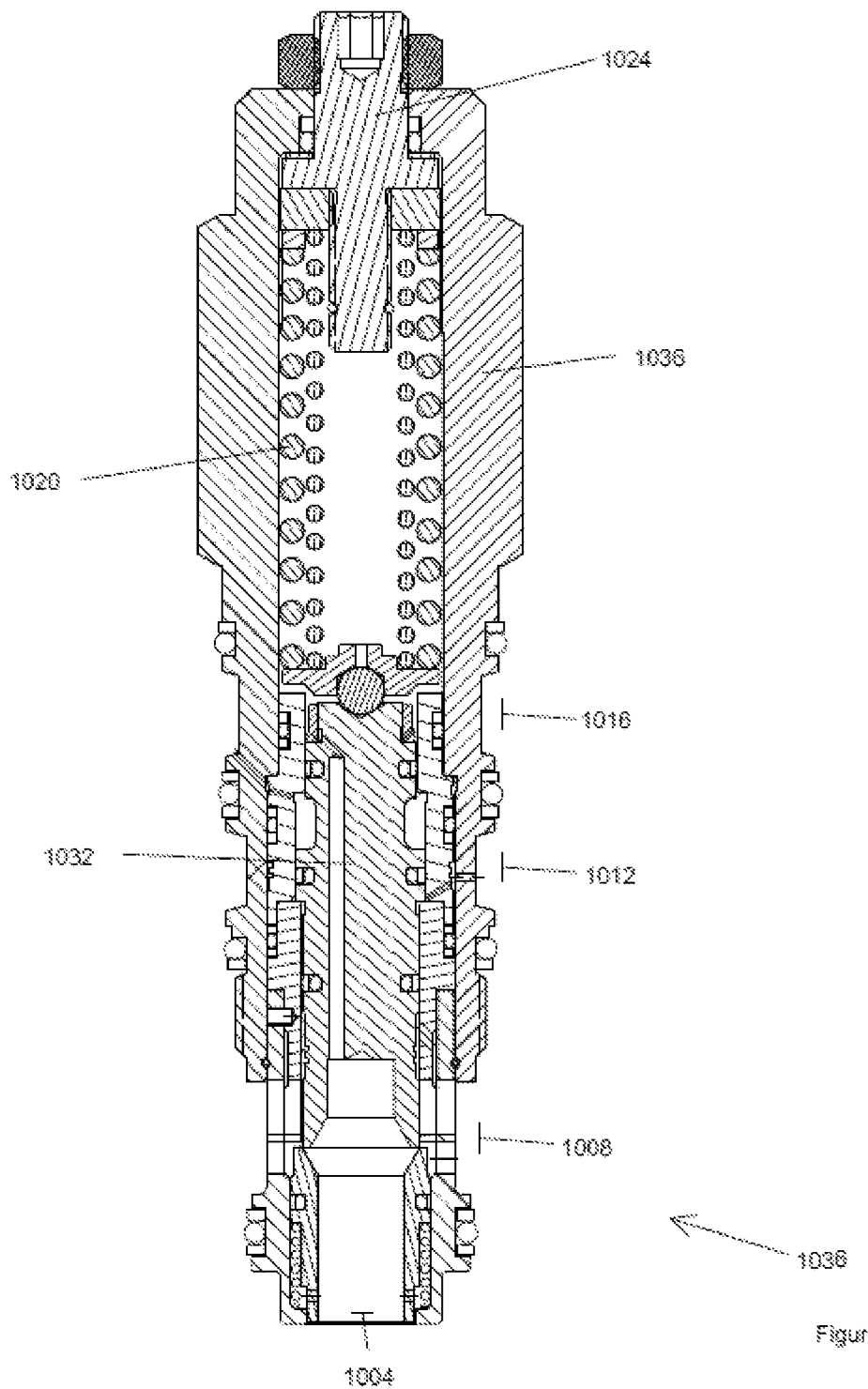
FIG. 2 illustrates a cross-sectional side view of a prior art, four-port counterbalance valve at minimum setting.
Figure 3:
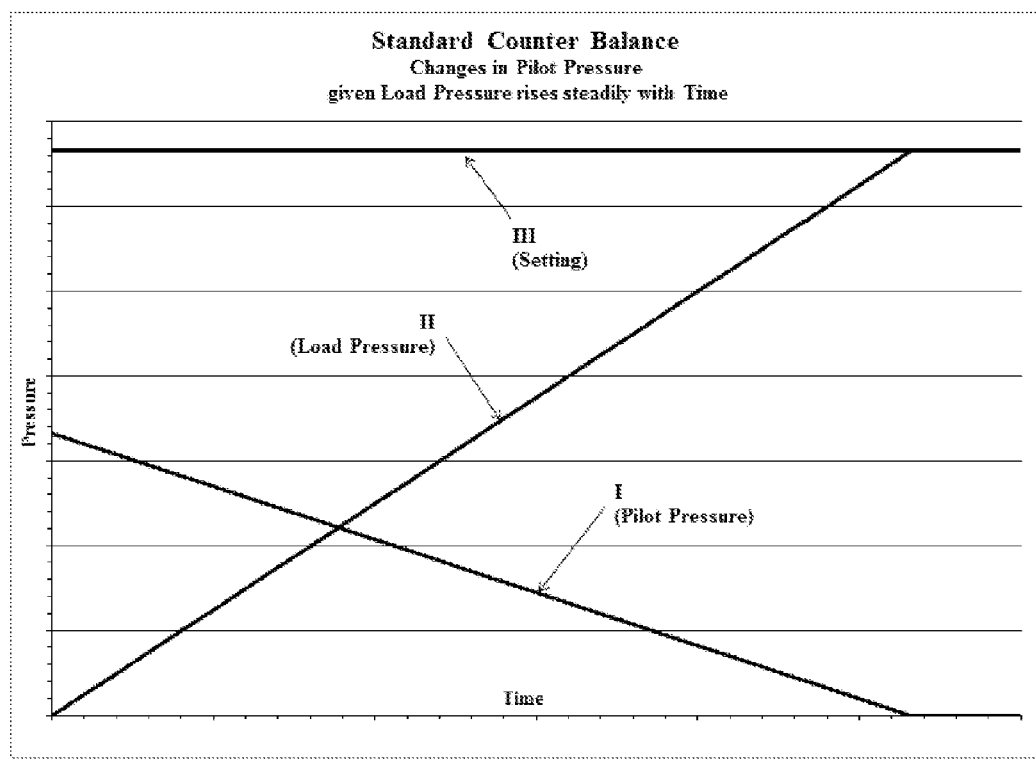
FIG. 3 graphically illustrates the changes in pilot pressure where load pressure rises steadily with time in a prior art CB valve.
Figure 4:
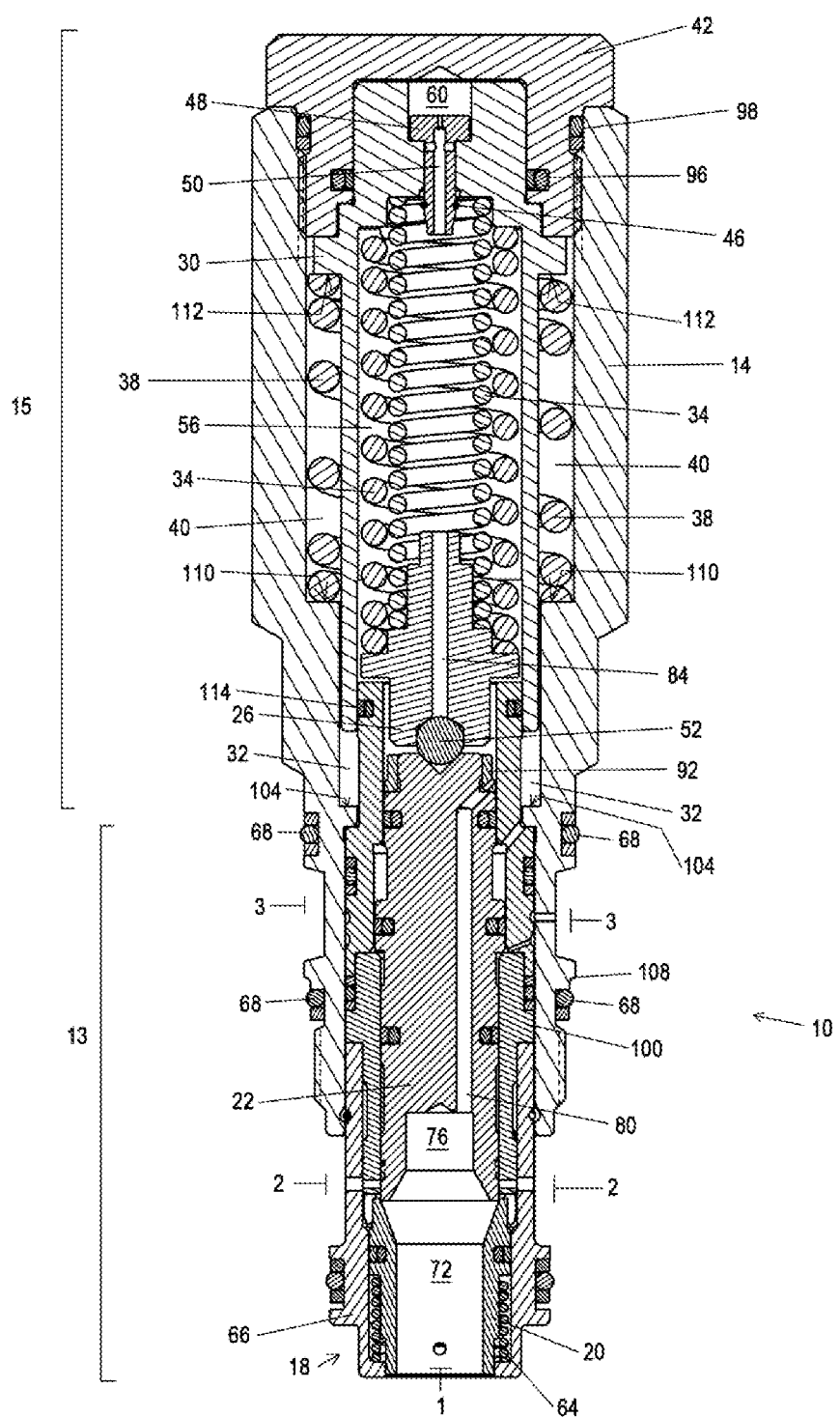
FIG. 4 illustrates a cross-sectional side view of a prior art, three-port dynamically adjusting counterbalance valve at minimum setting and in a seated or closed condition.
Figure 5:
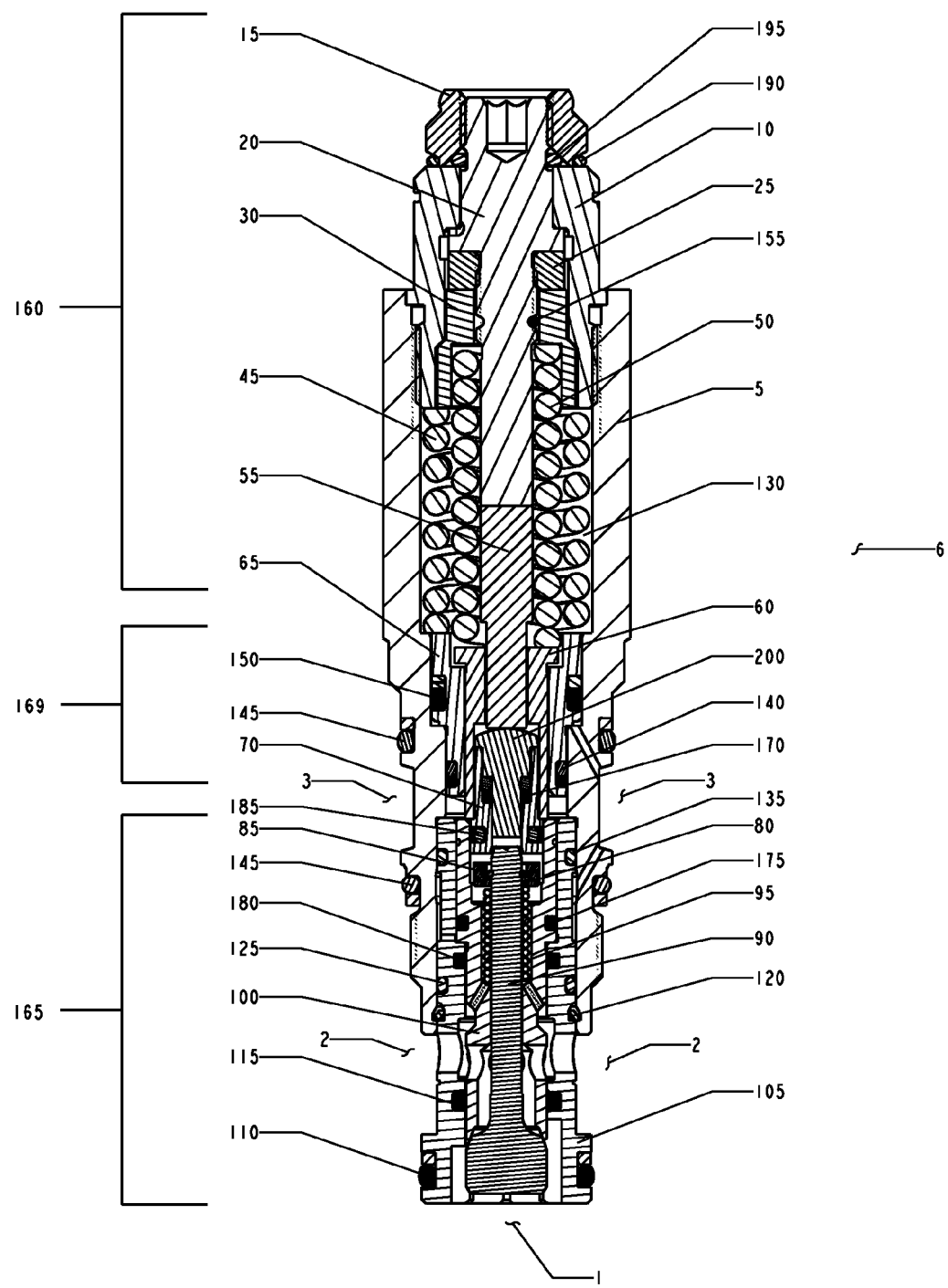
FIG. 5 illustrates a cross-sectional side view of a three port, dual pilot counterbalance valve according to an aspect of the present invention, with no load (or minimal load) and no pilot pressure.

The following detailed description and the appended drawings describe and illustrate exemplary embodiments of the invention solely for the purpose of enabling one of ordinary skill in the relevant art to make and use the invention. As such, the detailed description and illustration of these embodiments are purely exemplary in nature and are in no way intended to limit the scope of the invention, or its protection, in any manner. It should also be understood that the drawings may not be to scale and in certain instances details have been omitted, which are not necessary for an understanding of the present invention, such as conventional details of fabrication and assembly.

Definitions

Chattering: undesirable and uncontrolled opening and closing of a valve resulting in poor valve modulation.

Load Pressure ($P_{load}$): load applied to the load port.

Pilot Pressure ($P_{pilot}$): pressure required on the pilot port to open the valve.

Pilot Ratio (R): relief area divided by pilot area or ratio that acts as a multiplier to reduce the mechanical setting of a valve.

Setting (S): load pressure at which the valve begins to unseat or open.

Parts List

1 Load Port 1
2 Valve Port
3 Pilot Port
5 Dual Pilot CB Valve Body
7 Manifold
10 Guide Cap
15 Adjust Screw Lock Nut
20 Adjusting Screw
25 Adjusting Nut
30 Spring Adjust Spacer
35 Adjusting Screw Seals
40 Cap Seal
45 Outer Spring
50 Inner Spring
55 Pin
60 Piston Spacer
65 Pilot Sleeve
70 Pilot Spring Spacer
75 Intermediate Spring
80 Retainer
85 Wire Retaining Ring
90 Poppet
95 Check Spring
100 Piston
105 Sleeve
110 Nose O-Ring Seals
115 Internal O-Ring Seal A
120 Sleeve Retaining Ring
125 Internal O-Ring Seal B
130 Spring Chamber
135 Internal O-Ring Seal C
140 Internal Seal
145 Outer O-Ring Seal D
150 Internal Sleeve Seal
155 Wire Stop Ring
160 Setting Control Region
165 Main Stage Region
166 Shoulder of Adjusting Screw
167 Shoulder of Piston Spacer
168 Shoulder of Pilot Spring Spacer
169 Pilot Stage Region
170 Internal O-Ring for Spacer B
175 Internal O-Ring for Piston
180 Internal O-Ring E
185 Internal O-Ring F
190 External O-Ring for Lock Nut
195 Internal O-Ring for Lock Nut
200 Spacer B
205 Manifold
206 Triple Pilot CB Valve Body In certain embodiments of the present invention, adjustable dual pilot ratio valves are provided that employ a pilot pressure sleeve that assists in valve opening. When pilot pressure exceeds an outer spring preload force, the sleeve is able to assist the main piston spacer in overcoming biasing spring forces and compressing an inner spring in the valve. These dual and triple pilot ratio valves have the advantage of lower required pilot pressure to control loads, resulting in increased energy efficiency.

In other embodiments, the invention as disclosed provides dual and triple pilot ratio valves having low pilot ratios in areas where instability of the hydraulic circuit may occur.

In still other embodiments, the invention as disclosed provides dual and triple pilot ratio valves having a higher pilot ratio to save energy when the cylinder/motor has a high inlet and a low outlet pressure.

In certain embodiments, the invention as disclosed provides a pilot sleeve for higher pilot ratios that can be incorporated in different existing counterbalance valve designs.

In other embodiments, the invention provides triple pilot ratio valves that operate similarly to the disclosed dual pilot ratio valves, but give additional savings in energy efficiency as a result of reductions in CB valve setting by a fixed pressure when pilot pressures are very low or when the load is not yet moved.

Exemplary Embodiments

Figure 9:
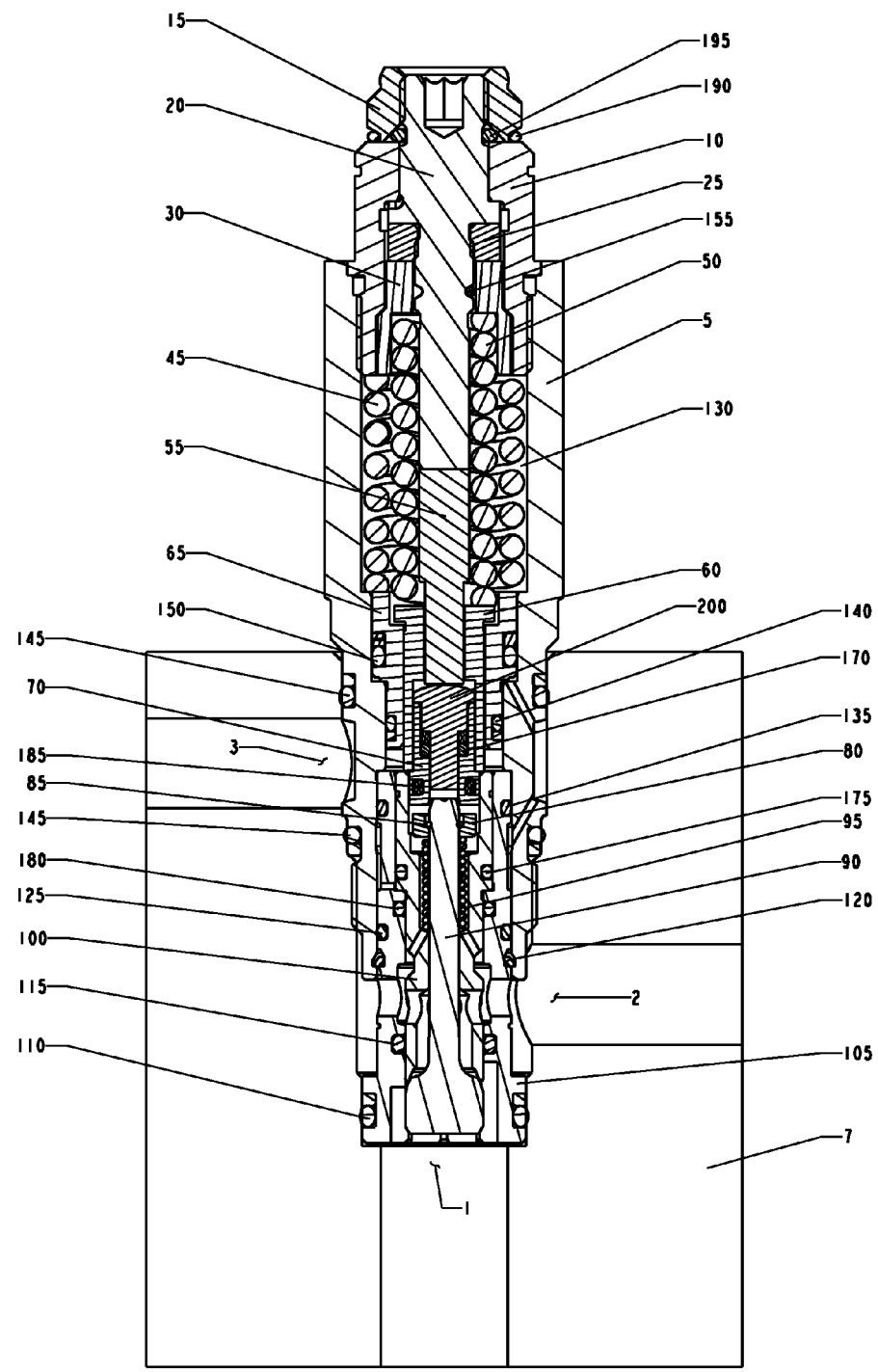
FIG. 9 illustrates a cross-sectional side view of a three port, dual pilot counterbalance valve installed in a manifold body 7 according to an aspect of the present invention.
Figure 10:
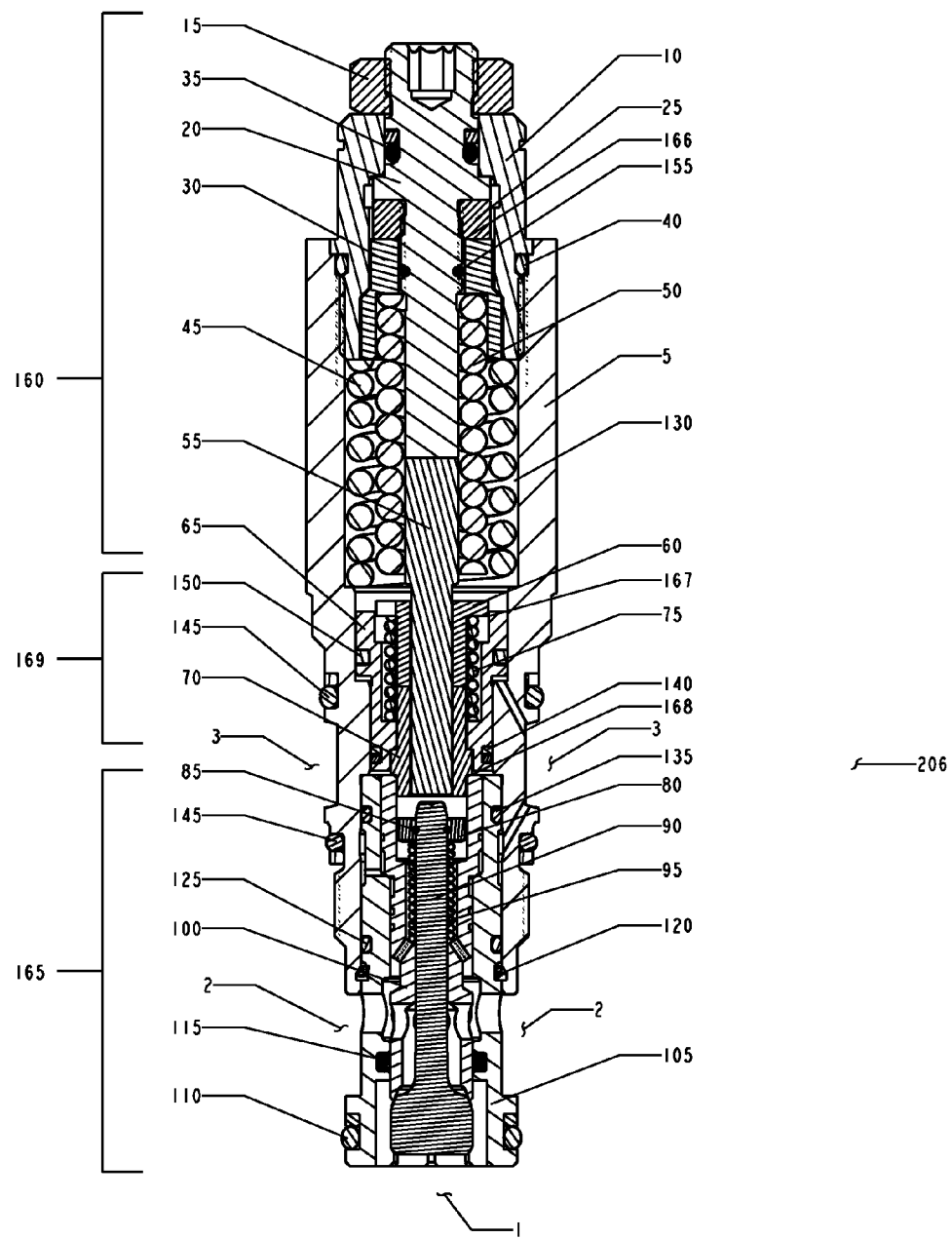
FIG. 10 illustrates a cross-sectional side view of a triple pilot counterbalance valve according to an aspect of the present invention, at minimum setting and seated or closed condition and pilot ratio is at high setting.
Figure 11:
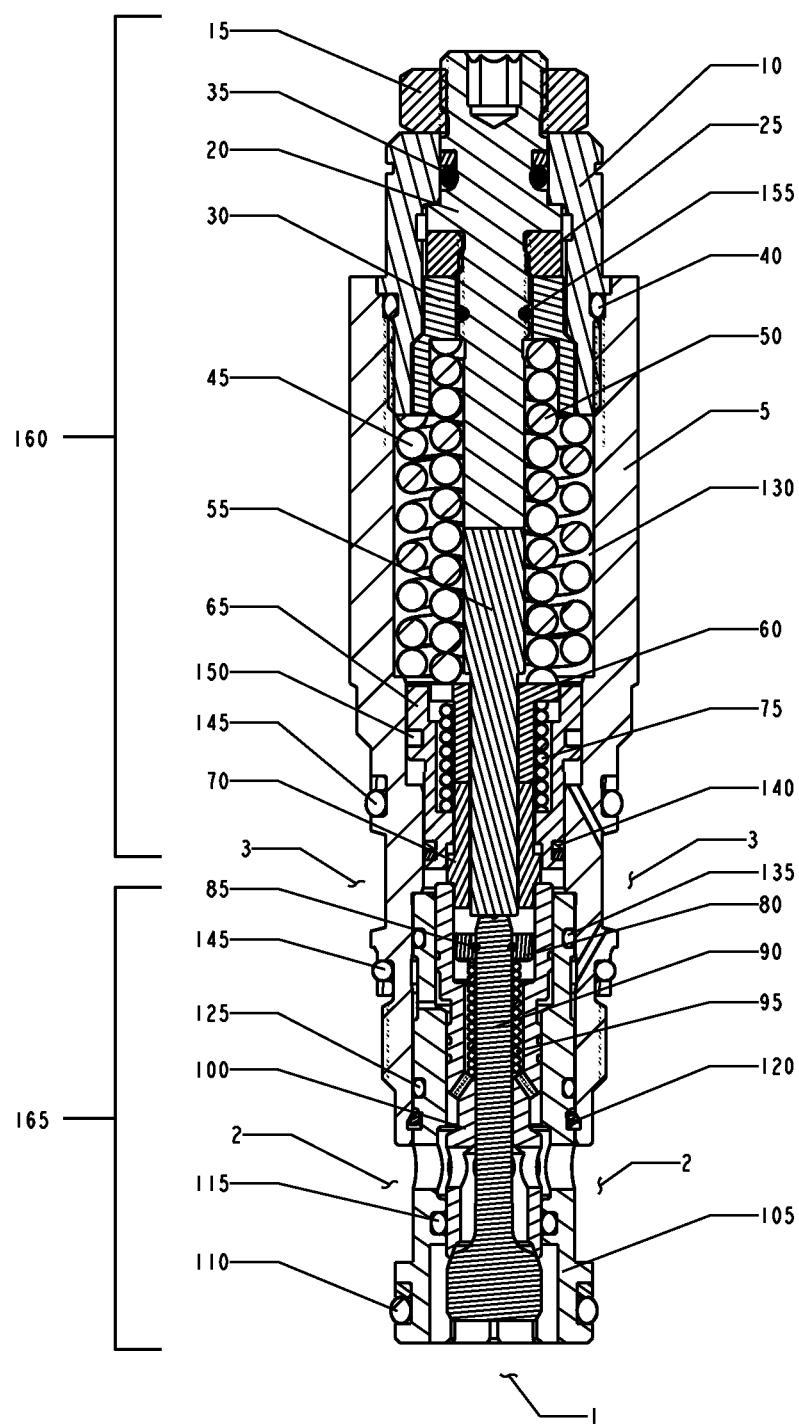
FIG. 11 illustrates a cross-sectional side view of a triple pilot counterbalance valve according to an aspect of the present invention, at an intermediate setting, where pilot pressure is sufficient to partially compress intermediate spring, and pilot ratio is at low setting.
Figure 12:
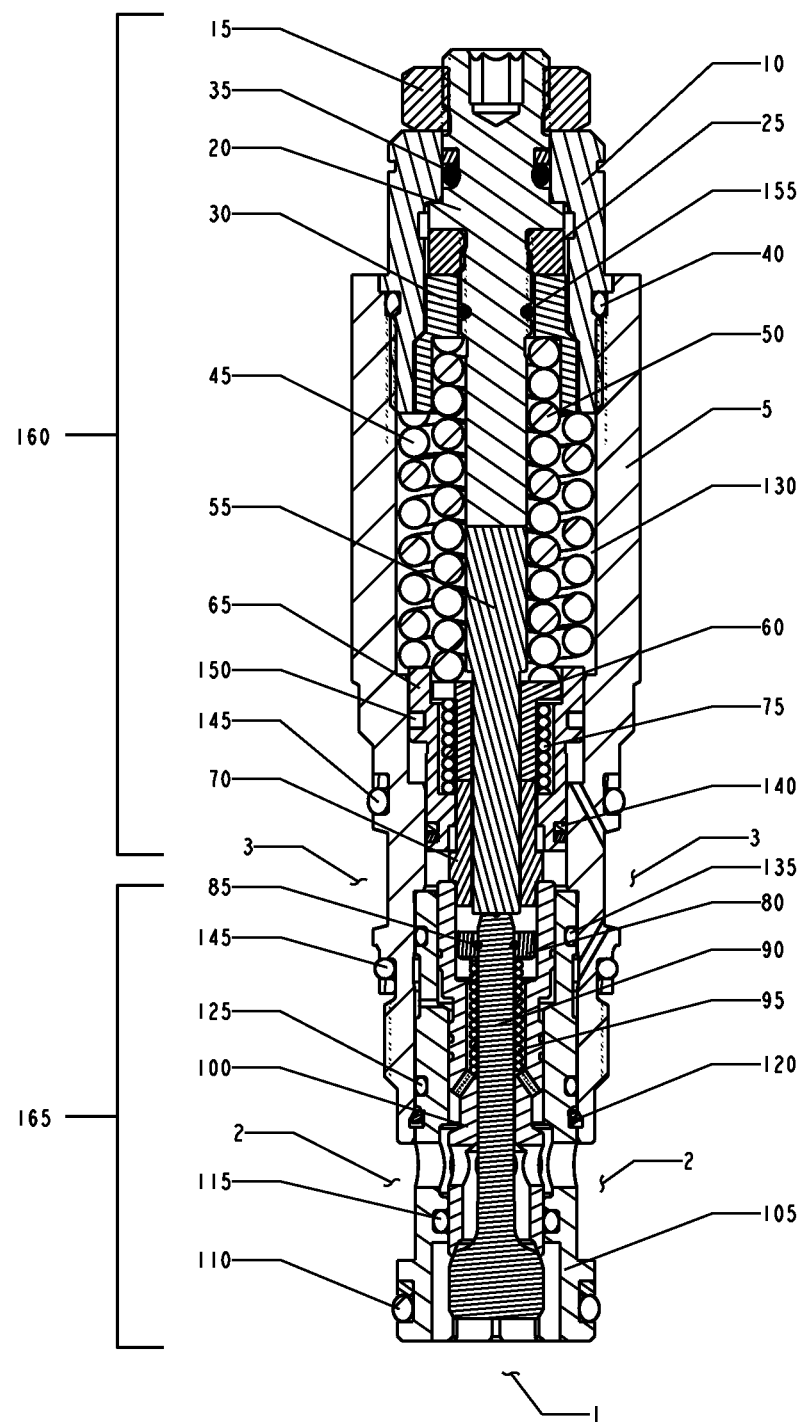
FIG. 12 illustrates a cross-sectional side view of a triple pilot counterbalance valve according to an aspect of the present invention, at an intermediate setting where pilot pressure is sufficient to fully compress intermediate spring and outer spring is at low pilot ratio-high pilot ratio crossover point.
Figure 13:
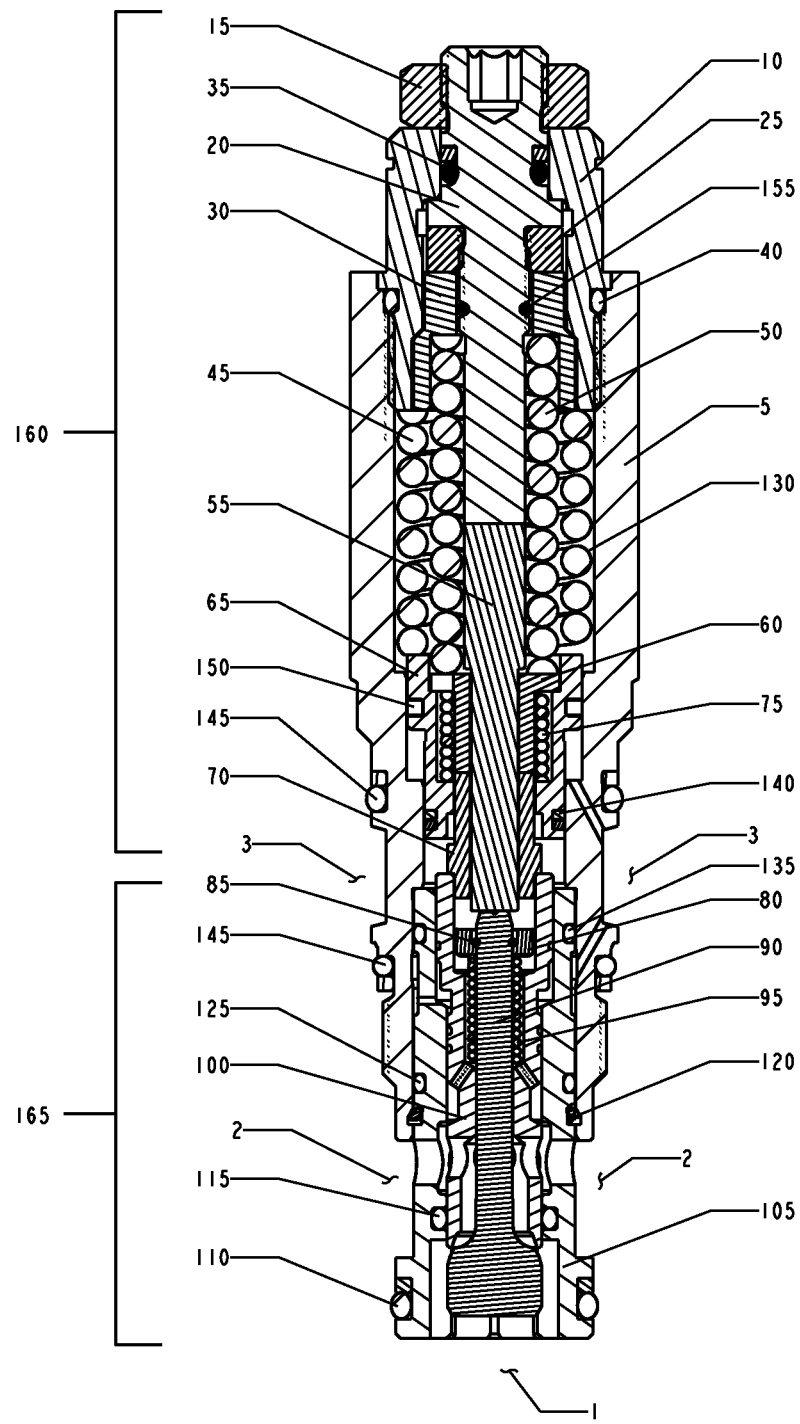
FIG. 13 illustrates a cross-sectional side view of a triple pilot counterbalance valve according to an aspect of the present invention, where pilot pressure is sufficient to assist compression of inner spring intermediate spring and pilot ratio is at high setting.
Figure 18:
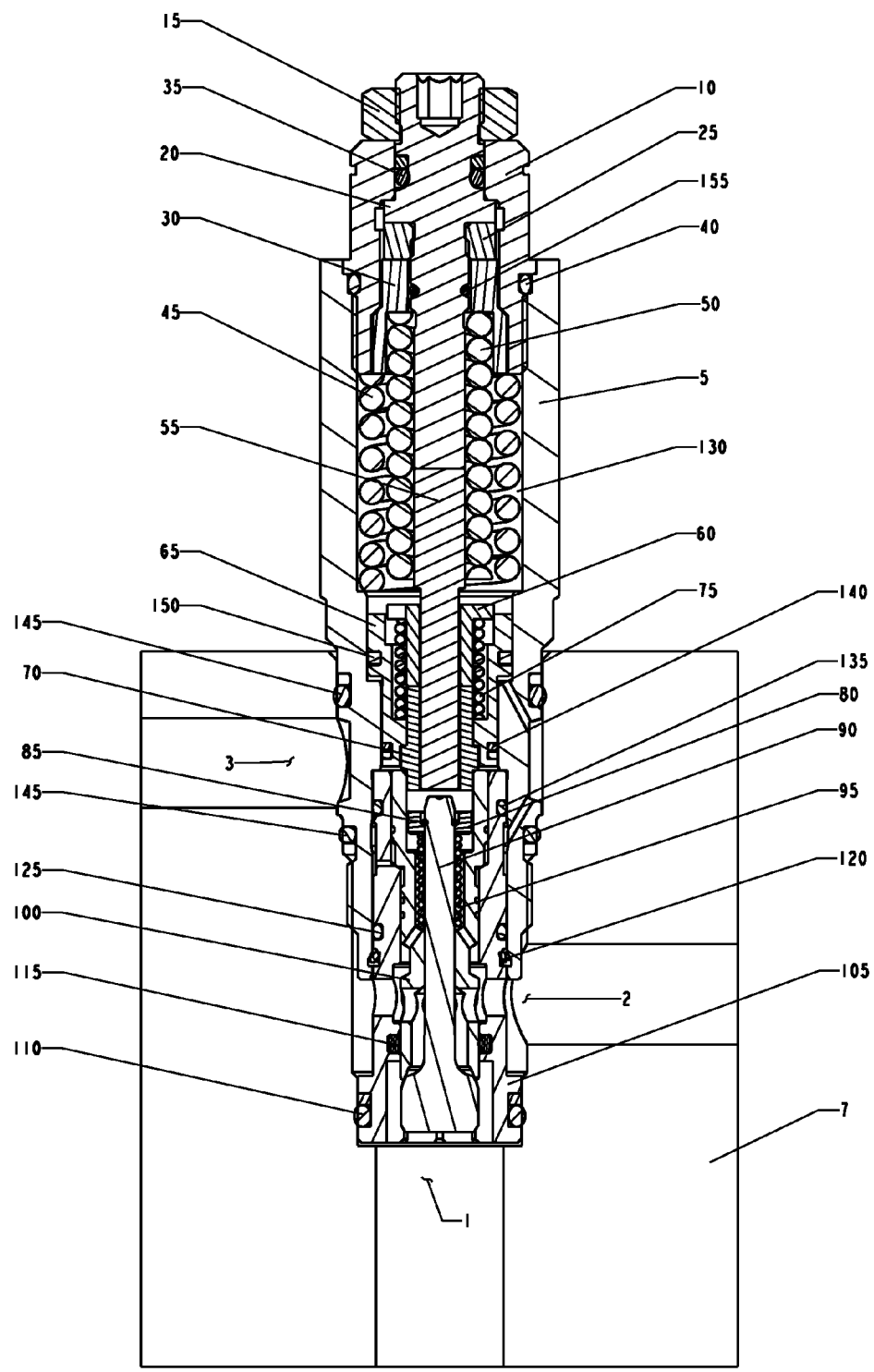
FIG. 18 illustrates a cross-sectional side view of a three port, triple pilot counterbalance valve installed in a manifold body 207 according to an aspect of the present invention.

Referring to the drawings, FIGS. 5-9 depict an illustrative embodiment of a dual pilot CB valve according to the present invention. CB valve 6 is provided with a valve body 5, a load port 1, a valve port 2, and a pilot port 3. FIG. 9 provides an illustration of CB valve 6 installed in a manifold 7. FIGS. 10-13 depict a second illustrative embodiment of a triple pilot CB valve according to the present invention. CB valve 206 is provided with a valve body 5, a load port 1, a valve port 2, and a pilot port 3. In use, CB valves 6 and 206 provide a low pilot ratio in areas where instability of the hydraulic circuit could occur, and a higher pilot ratio to save energy at higher inlet and lower outlet pressures where circuits are typically stable. The triple pilot ratio CB valve further reduces the valve setting by a fixed pressure when pilot pressures are very low, thus leading to additional savings. FIG. 18 provides an illustration of CB valve 6 installed in a manifold 207.

Referring to the drawings, FIGS. 5-9 depict an illustrative embodiment of a dual pilot CB valve according to the present invention. CB valve 6 has a setting control region 160, a pilot stage region 169 and a main stage 165. The pre-load setting control region 160 includes an outer valve or hex body 5 and end cap 10 that define a working cavity. Adjusting screw 20 is axially disposed within the working cavity and along the setting control region such that it can rotate within the valve body to advance or retract adjusting nut 25, to which is it is threadably connected. Adjusting nut 25, in combination with spacer 30, can slide axially within the valve body between screw 20 and shoulder 166 to compress or decompress inner spring 50 and outer spring 45 in response to axial rotation of screw 20. Once the desired pre-load pressure setting is established, it may be set by engaging lock nut 15 with screw 20, to which it is threadably connected. Pin 55 extends axially from screw 20 and acts as a stop for poppet 90. Inner spring 50 and outer spring 45 are compressed with the valve body generally between spacer 30 and pilot stage region 169, in particular, the combination of spacer 60 and pilot sleeve 65.

Piston spacer 60 and spacer 70 are axially disposed relative to each other within pilot stage 169, and piston spacer 60 slidably engages pilot sleeve 65. Sleeve 65 can slide axially within the pilot stage, independently of spacer 60 in response to pilot pressure through pilot load port 3.

Main stage 165 includes piston 100, poppet 90 and spring 95, each axially, slidably disposed within the valve body 5. Spring 95 biases poppet 90 to a sealed or seated position against piston 100. When pressure on load port 1 exceeds the predetermined pre-load setting, piston 100 and poppet 90 together slide longitudinally until poppet 90 contacts spacer 200. Further upward movement of piston 100 against spacer 60 as well as pilot sleeve 65, in response to excessive pressure, opens the valve allowing relief through valve port 2.

In more typical operation, dual pilot valves of the present invention have two operating points. The first operating point is a low pilot ratio setting when P1 (load pressure) is high and P3 (pilot pressure) is low. The second is a high pilot ratio setting when P3 is high and P1 is low, resulting in energy savings through reduced power consumption.

Figure 15:
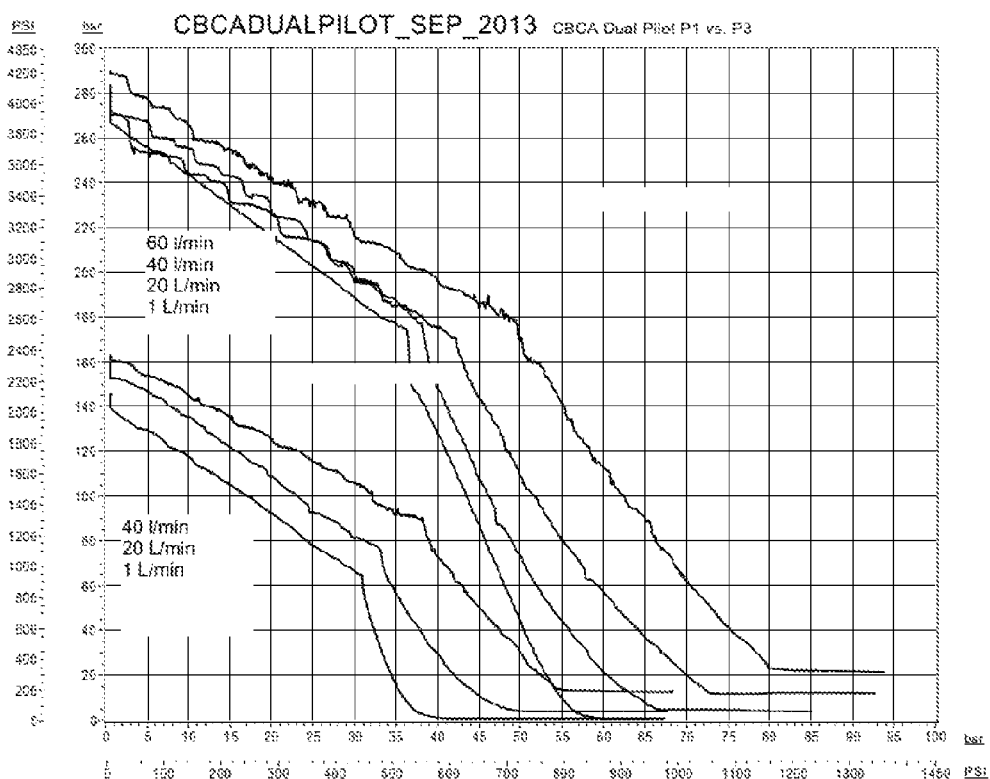
FIG. 15 graphically illustrates the performance of a dual pilot valve of an aspect of the present invention at two different mechanical settings.

The proposed dual pilot ratio valve has a low gradient (low pilot ratio) when P1 is high and P3 is low. It has a higher gradient when P3 is high and P1 is low. The pilot ratio increases when pilot pressure P3 is high enough to move a $2^{nd}$ sleeve against the preload of an additional, outer spring. The transition from low to high pilot ratio changes with the setting of the valve since a spacer on the adjust screw of the valve further preloads both the inner and the outer spring when the mechanical setting is changed by turning the adjust screw. FIG. 15 graphically illustrates the performance of the dual pilot ratio valve for 2 different mechanical settings. The main purpose of this design is to safe power in lowering load with high P3 and low P1.

Figure 16:
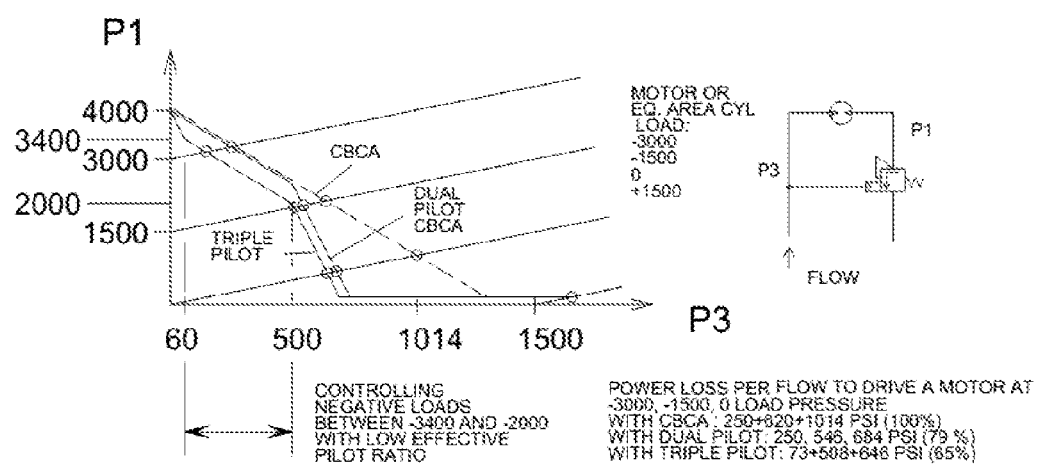
FIG. 16 graphically illustrates a comparison of efficiencies for standard CBCA valves versus dual and triple pilot valves of aspects of the present invention at three different hydraulic fluid flow rates.

FIG. 16 shows operation points for 4 different load conditions (grey rising straight lines represent a motor at 4 different loads). The dual pilot ratio valve (green) reduces the required power to lower loads from 100 to 79%. The Triple ratio valve needs only 65%.

In the example illustrated in FIG. 16, the setting of the triple ratio valve is 4000 psi, while the highest load induced pressure is 3000 psi. Reducing the setting of the valve from 4000 to 3400 psi does not cause a movement of the motor. As a result, the initial high pilot ratio (for pilot pressure below 60 psi) is not critical with respect to stability of the load. But the reduced setting helps saving energy for all higher pilot pressures.

Referring to the drawings, FIGS. 10-13 depict an illustrative embodiment of a triple pilot CB valve according to the present invention. CB valve 206 has a setting control region 160, a pilot stage region 169 and a main stage 165. The pre-load setting control region 160 includes an outer valve or hex body 5 and end cap 10 that define a working cavity. Adjusting screw 20 is axially disposed within the working cavity and along the setting control region such that it can rotate within the valve body to advance or retract adjusting nut 25, to which is it is threadably connected. Adjusting nut 25, in combination with spacer 30, can slide axially within the valve body between screw 20 and shoulder 166 to compress or decompress inner spring 50 and outer spring 45 in response to axial rotation of screw 20. Once the desired pre-load pressure setting is established, it may be set by engaging lock nut 15 with screw 20, to which it is threadably connected. Pin 55 extends axially from screw 20 and acts as a stop for poppet 90. Inner spring 50 and outer spring 45 are compressed with the valve body generally between spacer 30 and pilot stage region 170, in particular, the combination of spacer 60 and pilot sleeve 65.

Spacer 60 and spacer 70 are axially disposed relative to each other within pilot stage 169 and each slidably engage pilot sleeve 65. Spring 75, disposed axially about spacers 60 and 70 between an arm of spacer 60 and an arm of pilot sleeve 65, biases sleeve 65 to a minimum pilot pressure setting. Sleeve 65 can slide axially within the pilot stage, independently of spacers 60 and 70 between shoulder 167 at one end and shoulder 168 on the other, respectively, in response to pilot pressure through pilot load port 3.

Main Stage 165 includes piston 100, poppet 90 and spring 95, each axially, slidably disposed within the valve body 5. Spring 95 biases poppet 90 to a sealed or seated position against piston 100. When pressure on load port 1 exceeds the predetermined pre-load setting, piston 100 and poppet 90 together slide upward until poppet 90 contacts pin 55. Further upward movement of piston 100 against spacers 60 and 70 as well as pilot sleeve 65, in response to excessive pressure, opens the valve allowing relief through valve port 2.

As earlier disclosed, dual pilot valves of the present invention have two operating points. Triple pilot valves as presented herein have a further operating point. In addition to a low pilot ratio setting when P1 (load pressure) is high and P3 (pilot pressure) is low and a high pilot ratio when P3 is high and P1 is low, the triple pilot ratio valve as described herein results in additional energy savings when the setting of the counterbalance valve is reduced with a high effective area before the load starts to move. When compared with typical prior art counterbalance valves, certain embodiments of a triple pilot valve of the present invention advantageously have a lower pilot pressure for the same setting and flow as for the standard CB valve. Thus, the triple ratio valve may be used in certain applications where CB valves with a higher pilot ratio valve (10:1) would cause instability. That provides power savings (about 30% for negative or low loads) or results in higher speeds for the same pilot pressure (up to 100% on winches or cylinders without load). When less power is lost across the counterbalance valve, more power is available to move the cylinder or motor.

In situations where spring 75 biasing force is greater than pilot pressure, a pilot ratio setting results due to pilot sleeve contact with spacer 70. (See FIG. 10). For pilot pressure situations where pilot pressure is greater than spring 75 biasing force but less than outer spring 45 biasing force, the pilot sleeve is not in contact with either spacer 60 or spacer 70, and the valve has a low pilot ratio setting. The operating range in that pilot pressure region controls overrunning loads. (See FIG. 11). For pilot pressures in excess of the outer spring 45 biasing force, the pilot sleeve 65 is in contact with spacer 60. Increasing pilot pressure above this point (operating ranges with positive loads where stability is not critical), allows sleeve 65 to assist spacer 60, reducing the valve setting with a high effective pilot ratio. (See FIGS. 12 and 13).

Figure 6:
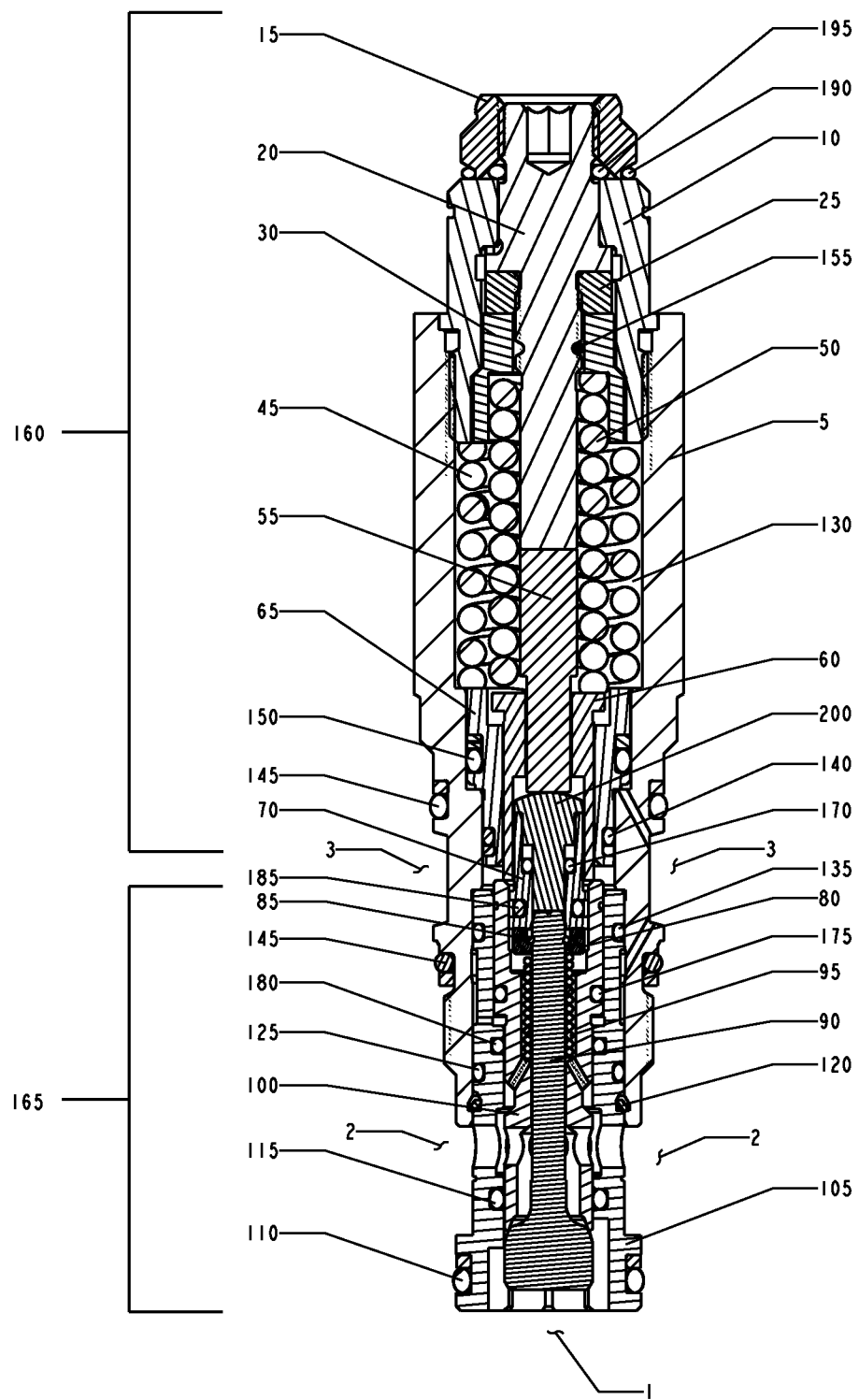
FIG. 6 illustrates a cross-sectional side view of a three port, dual pilot counterbalance valve according to an aspect of the present invention, where load pressure is sufficient to shift piston 100, Spacer 60, and poppet 90 until poppet 90 comes into contact with pin 200 and where there is insufficient pilot pressure to move pilot sleeve 65.
Figure 7:
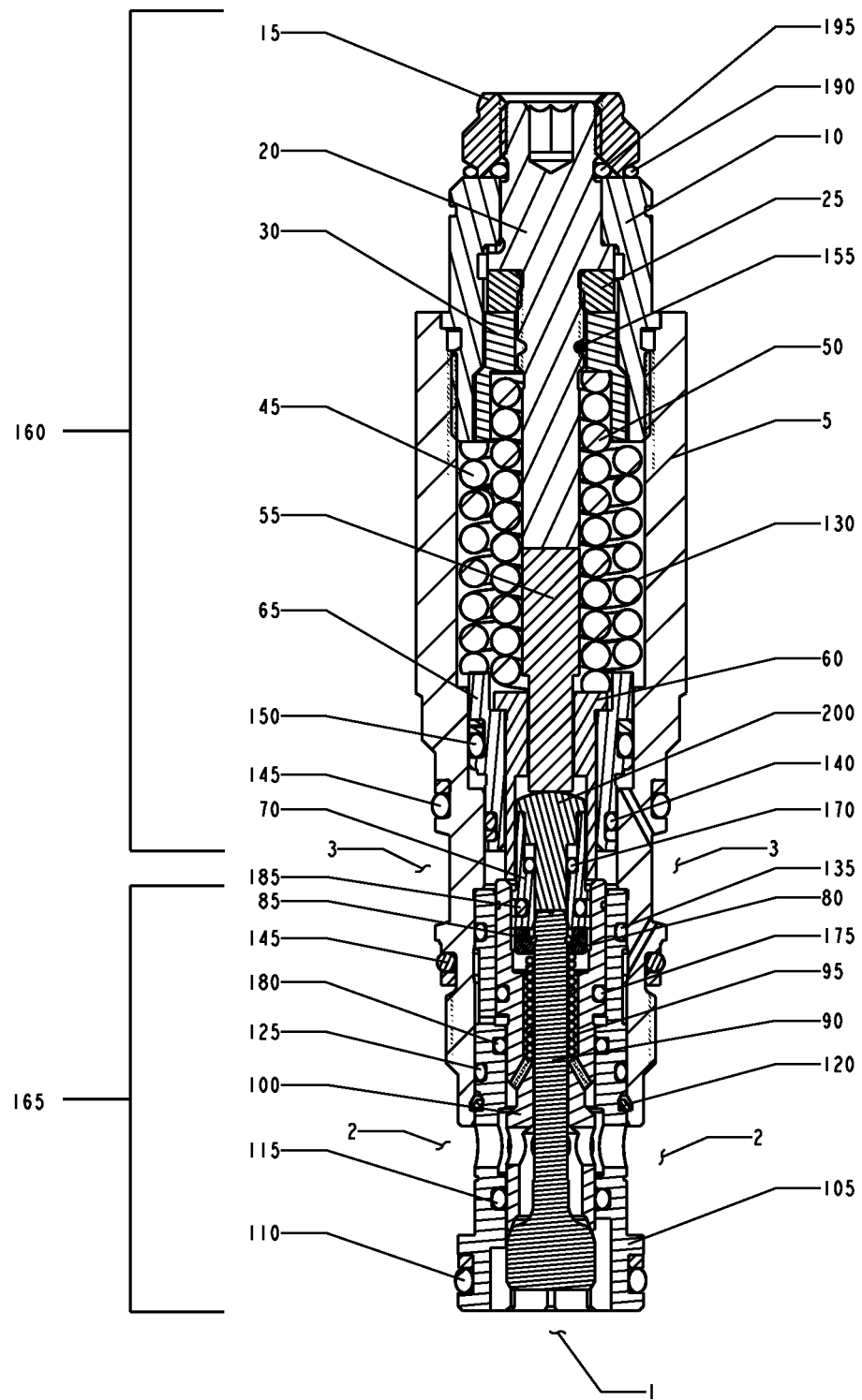
FIG. 7 illustrates a cross-sectional side view of a three port, dual pilot counterbalance valve according to an aspect of the present invention, where FIG. 6 valve experiences sufficient pilot pressure to compress outer spring 45 and move pilot sleeve into contact with a shoulder of piston spacer 60.
Figure 8:
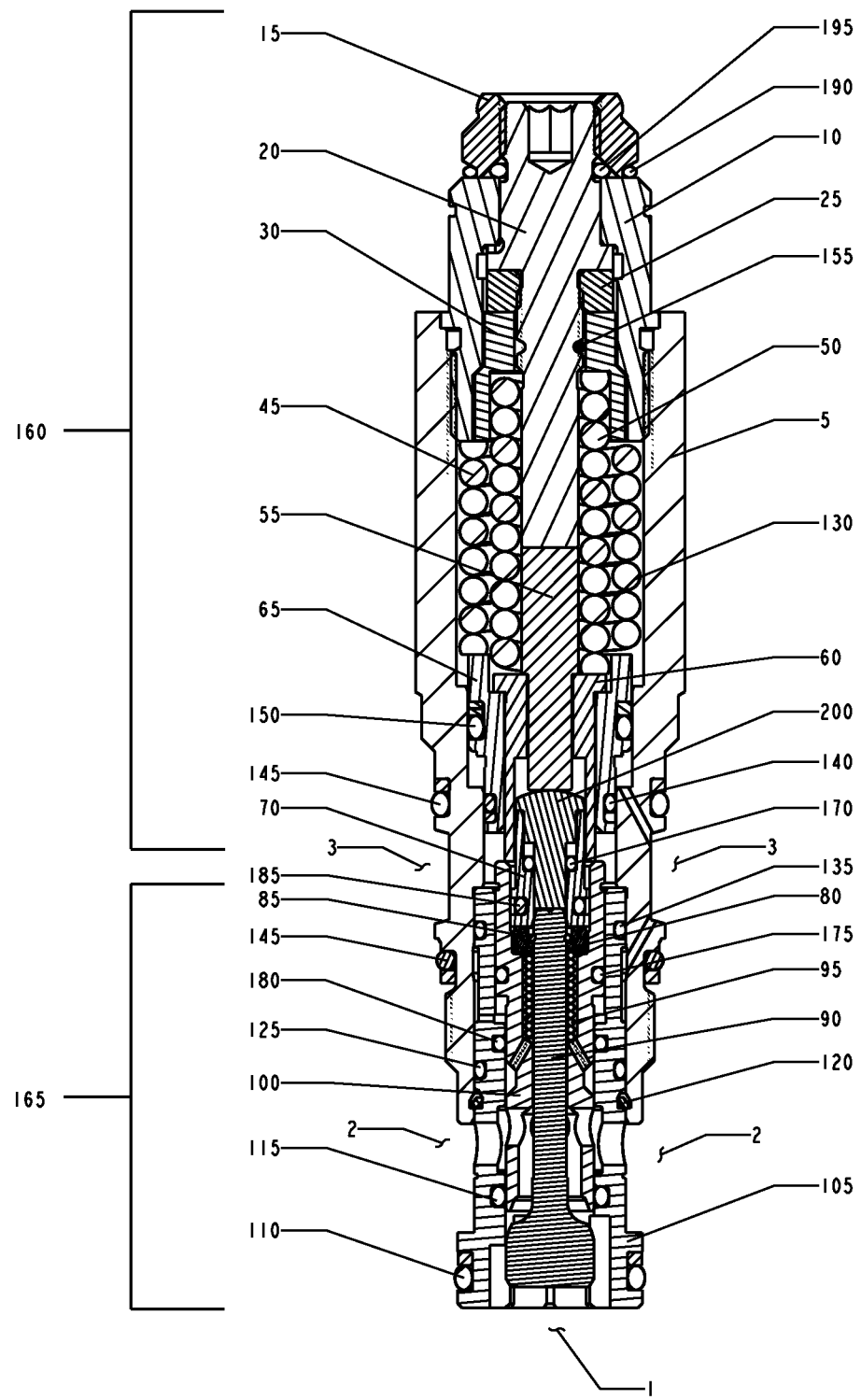
FIG. 8 illustrates a cross-sectional side view of a three port, dual pilot counterbalance valve according to an aspect of the present invention, where FIG. 6 valve experiences sufficient pilot pressure to compress outer spring 45 and assist piston spacer 60 in compressing inner spring 50.

In some aspects of the present invention, the dual pilot or triple pilot counterbalance valve is atmospherically vented. FIG. 6 provides an exemplary embodiment of a vented dual pilot valve of the present invention. Triple pilot valves of the present invention may be similarly vented, as appreciated by those of ordinary skill in the art. As used herein, the term "vented" refers to situations where pressure on port 2 has no effect on the setting of the valve. The valve is insensitive towards pressure on port 2 because the seal 185 separates the pressure on port 2 from the pressure experienced by the inner spring 50, outer spring 45 and the spring chamber 130 containing the two springs. The seal contacts the piston on a diameter equal to the seat diameter. Therefore the pressure on port 2 sees no effective area on the piston.

In view of the present disclosure, a person of ordinary skill in the art will appreciate that the setting profile of a CB valve of the present invention can be altered or adjusted by changing the differential areas and springs of the CB valve. Therefore, one of ordinary skill in the art will appreciate that the CB valve of the present invention can be readily outfitted to provide a desirable CB valve profile for different applications.

Any other undisclosed or incidental details of the construction or composition of the various elements of the disclosed embodiments of the present invention are not believed to be critical to the achievement of the advantages of the present invention, so long as the elements possess the attributes needed for them to perform as disclosed. Certainly, one of ordinary skill in the hydro-mechanical arts would be able to conceive of a wide variety of valve shapes and sizes and successful combinations of the invention disclosed herein. The selection of these and other details of construction are believed to be well within the ability of one of even rudimentary skills in this area, in view of the present disclosure.

Figure 17:
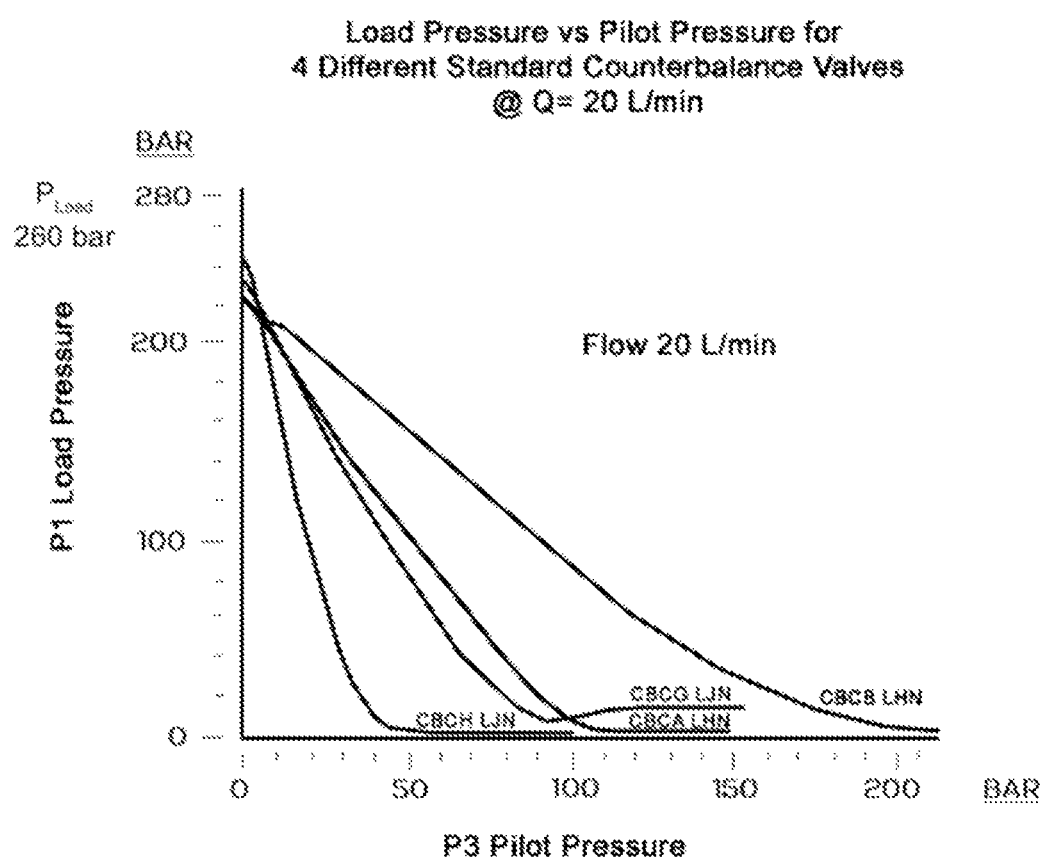
FIG. 17 graphically illustrates a plot of load pressure versus pilot pressure for 4 prior art counterbalance valves.

FIG. 17 graphically illustrates the load pressure versus pilot pressure curve for four different standard prior art counterbalance valves wherein Q (rated flow) is 20 l/min. When the pilot pressure is 0, the valve is at the spring preload mechanical setting. As the pilot pressure is increased, the valve setting is reduced as the valve gradually opens and holds less load pressure. The slope of the curves for each of the valves illustrates the pilot ratio such that the flatter the curve the lower the pilot ratio.

Figure 14:
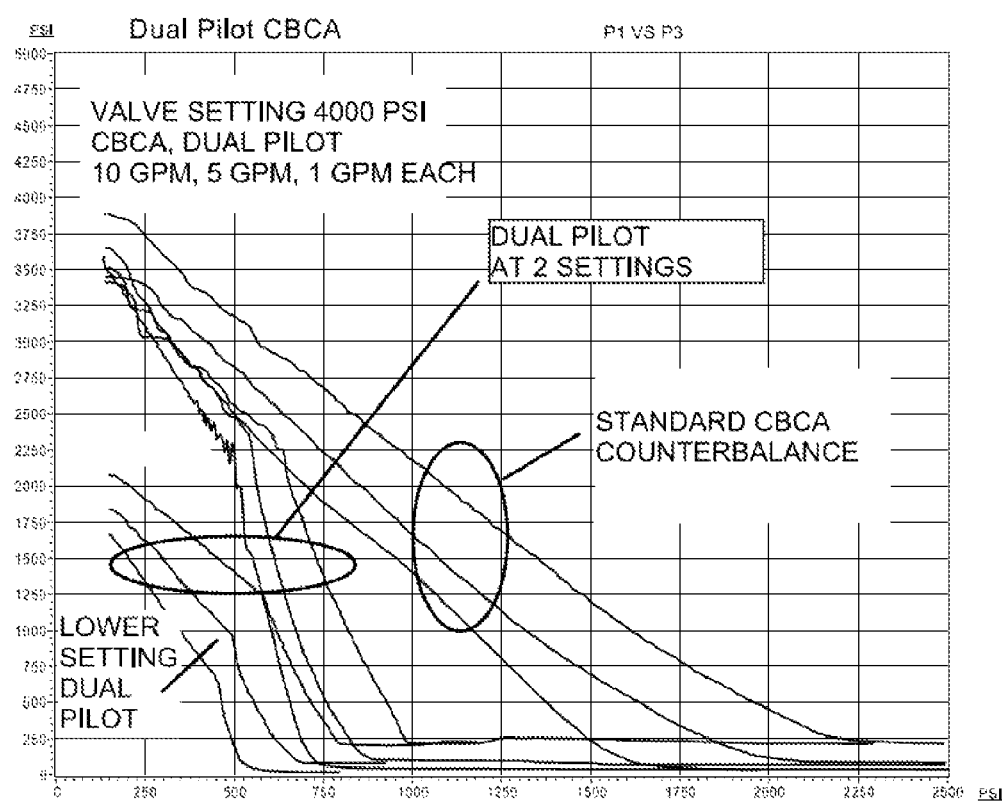
FIG. 14 graphically illustrates a comparison between prior art CBCA counterbalance valves and two settings of dual pilot valves of an aspect of the present invention, demonstrating the improved power efficiencies of dual pilot valves over prior art counterbalance valves.

While FIG. 17 illustrates the gradually reduced valve setting as a function of increasing pilot pressure, FIG. 14 graphically illustrates some of the advantages of a dual pilot ratio valve as compared to a prior art CBCA counterbalance valve. FIG. 14 illustrates typical performance curves for dual pilot valves of the present invention at two different settings, that for pilot pressures above a certain setting, the valve transitions to a higher pilot ratio when increasing pilot pressures are supplied, which in turn leads to more efficient use of the power source providing the desired pilot pressure, thus demonstrating the improved power efficiencies of dual pilot valves over prior art counterbalance valves.

Figure 19:
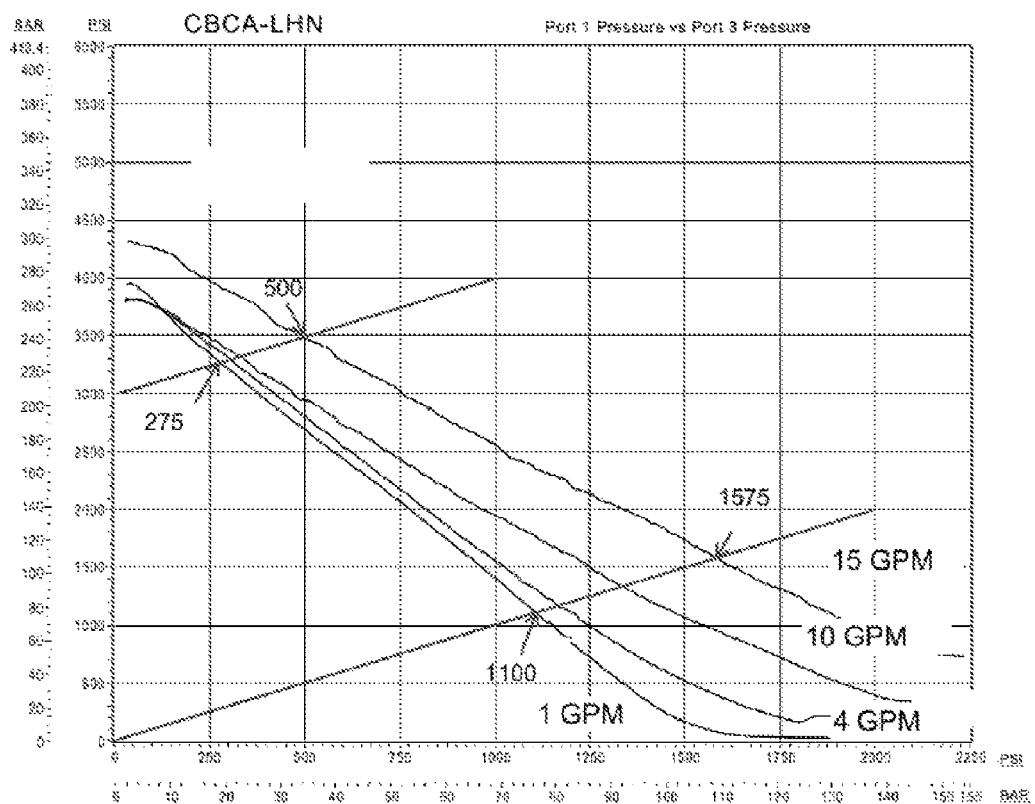
FIG. 19 graphically illustrates a plot of load pressure versus pilot pressure for a prior art counterbalance valve at four different constant flows.
Figure 20:
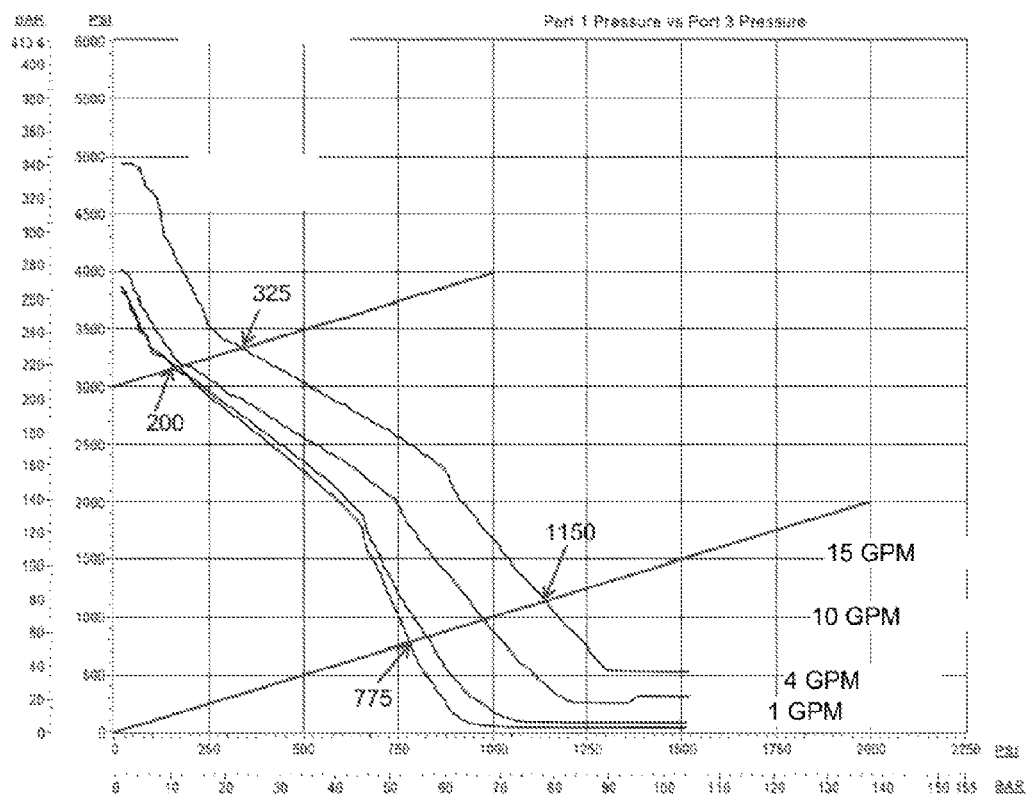
FIG. 20 graphically illustrates a plot of load pressure versus pilot pressure for an exemplary triple pilot valve of the present invention at the same four constant flows illustrated for the prior art counterbalance valve employed in FIG. 19.

FIG. 19 graphically illustrates the load pressure vs. pilot pressure for a standard CBCA valve at 4 different constant flows. The valve has a setting of 4000 psi. FIG. 20 graphically illustrates the triple ratio valve with the same setting under the same conditions. The two lines having positive slope in each figure describe the pressures across a motor that sees 3000 psi overrunning load (upper line) and no load (line through origin). A comparison demonstrates that where a standard CB valve requires 500/275/1525 and 1100 psi load pressure, the triple ratio valve requires only 325/200/1150 and 775 psi to move the motor at the same speed and load. The savings are about 30% on average for those 4 operating points. The four operating points describe a cylinder that sees a high overrunning load (upper line) and no load (lower line). The performance curves of the valve were tested at 4 different flows (1, 4, 10 and 15 GPM). The 4 operating points describe a high and a low load, at 1 and 15 GPM each. For the same cylinder speed and force, it would require 275, 500, 1100 and 1575 psi pilot pressure if the standard counterbalance valve was used, and only 200, 325, 775 and 1150 psi if the 'Triple Pilot' valve was used. Both valves had the same setting of 280 bar. When the cylinder is moved at high speed with no outer force against the counterbalance valve with 280 bar setting, an inlet pressure of 1575 psi is required. At a flow rate of 15 GPM that is the equivalent of about 10.8 KW horse power. That loss of power may be reduced to about 7.9 KW if the 'Triple Pilot' valve is instead employed. The calculation assumed an equal area cylinder or a motor. The savings could be higher or lower with a differential area cylinder.

If only an inlet pressure of 1000 psi is available to move a motor without load (lowering a winch with no load on the hook), a standard CBCA with 4000 psi setting would not open. The triple ratio valve with the same setting would allow a flow of 10 GPM.

Illustrative embodiments of the present invention have been described in considerable detail for the purpose of disclosing the practical, operative structure whereby the invention may be practiced advantageously. The designs described herein are intended to be exemplary only. The novel characteristics and features of the present invention may be incorporated in other structural forms without departing from the spirit and scope of the present invention. The invention encompasses embodiments both comprising and consisting of the elements described with reference to the illustrative embodiments. The invention illustratively disclosed herein suitably may be practiced in the absence of any element which is not specifically disclosed herein. The invention illustratively disclosed herein suitably may also be practiced in the absence of any element which is not specifically disclosed herein and that does not materially affect the basic and novel characteristics of the claimed invention.

Unless otherwise indicated, all ordinary words and terms used herein shall take their customary meaning as defined in *The American Heritage Dictionary*, Third Edition. All technical terms shall take on their ordinary and customary meaning as established by the appropriate technical discipline utilized in that particular art.

What is claimed is:

1. A counterbalance valve, comprising:
a valve body having:
   a first end, a second end, and a longitudinal chamber therebetween;
   a load port, a valve port, and a pilot port all of which are configured to communicate with the longitudinal chamber;
   a piston positioned within the longitudinal chamber, the piston being longitudinally slidable along the longitudinal axis between an open position and a closed position,
      wherein in the open position a fluid passageway is established between the load port and the valve port, and in the closed position the load port is sealingly isolated from the valve port;
   an adjusting screw disposed within the longitudinal chamber, the adjusting screw configured for rotation about the longitudinal axis and threadably connected to an adjusting nut, the adjusting nut disposed within the longitudinal chamber, and slidable along the longitudinal axis between a minimum position and a maximum position;
   a spring adjust spacer disposed within the longitudinal chamber along the longitudinal axis and abutting the adjusting nut; the spring adjust spacer slidable along the longitudinal axis between a minimum position and a maximum position;
   an inner spring positioned within the longitudinal chamber along the longitudinal axis;
   an outer spring positioned within the longitudinal chamber along the longitudinal axis;
   a piston spacer disposed within the longitudinal chamber and positioned between the inner spring and the piston;
   a pilot sleeve disposed within the longitudinal chamber and positioned between the outer spring and the piston and configured to communicate with the pilot port, the pilot sleeve further configured to assist the piston spacer in compressing the inner spring when pilot pressure exceeds the outer spring's biasing force; and
   an intermediate spring disposed within the longitudinal chamber along the longitudinal axis and positioned between a shoulder of the piston spacer and a shoulder of the pilot sleeve, the intermediate spring and piston spacer collectively biasing the pilot sleeve for contacting a shoulder of a pilot spring spacer disposed within the longitudinal chamber along the longitudinal axis and abutting the piston spacer, the pilot sleeve further configured to maintain contact with the shoulder of the pilot spring spacer when piston load pressures are less than the intermediate spring's biasing force;
      wherein the adjusting screw, adjusting nut, spring adjust spacer, inner spring, piston spacer, and pilot sleeve collectively bias the piston into the closed position.

2. The counterbalance valve of claim 1, further comprising a guide cap fixed to the longitudinal chamber, the guide cap defining a terminal chamber for receiving a portion of the adjusting screw, the adjusting nut, and the spring adjust spacer.

3. The counterbalance valve of claim 2, further comprising a cap seal having a first diameter, the cap seal forming a fluid seal between the guide cap and the valve body.

4. The counterbalance valve of claim 3, further comprising a second seal having a diameter smaller than the diameter of the cap seal, thereby creating a differential area.

5. A counterbalance valve, comprising:
a valve body having:
   a first end, a second end, and a longitudinal chamber therebetween
   a load port, a valve port, and a pilot port all of which are configured to communicate with the longitudinal chamber;
a piston positioned within the longitudinal chamber, the piston being longitudinally slidable along the longitudinal axis between an open position and a closed position, wherein in the open position a fluid passageway is established between the load port and the valve port, and in the closed position the load port is sealingly isolated from the valve port;
a biasing means for biasing the piston into the closed position;
an adjusting means for hydro-mechanically adjusting pilot ratio in response to negative load;
a cap fixed to the longitudinal chamber, the cap defining a terminal chamber for receiving a portion of the adjusting screw, the adjusting nut, and the spring adjust spacer; and
a cap seal having a first diameter, the cap seal forming a fluid seal between the guide cap and the valve body.

6. The counterbalance valve of claim 5, the biasing means, further comprising: an adjusting screw, adjusting nut, spring adjust spacer, inner spring, outer spring, and piston spacer, collectively biasing the piston into the closed position.

7. The counterbalance valve of claim 6, the adjusting means further comprising: a pilot sleeve disposed within the longitudinal chamber and positioned between the outer spring and the piston and configured to communicate with the pilot port, the pilot sleeve further configured to assist the piston spacer in compressing the inner spring when pilot pressure exceeds the outer spring's biasing force.

8. The counterbalance valve of claim 5, further comprising an intermediate spring disposed within the longitudinal chamber along the longitudinal axis and positioned between a shoulder of the piston spacer and a shoulder of the pilot sleeve, the intermediate spring and piston spacer collectively biasing the pilot sleeve for contacting a shoulder of a pilot spring spacer disposed within the longitudinal chamber along the longitudinal axis and abutting the piston spacer, the pilot sleeve further configured to maintain contact with the shoulder of the pilot spring spacer when piston load pressures are less than the intermediate spring's biasing force.

9. The counterbalance valve of claim 5, further comprising a second seal having a diameter smaller than the diameter of the cap seal, thereby creating a differential area.

10. A counterbalance valve, comprising:
a valve body having a longitudinal chamber; and a load port, a valve port, and a pilot port all of which are configured to communicate with the longitudinal chamber;
a piston positioned within the longitudinal chamber, the valve having an adjusting means that increases pilot ratio when pilot pressure exceeds an outer spring's biasing force;
an intermediate spring disposed within the longitudinal chamber along the longitudinal axis and positioned between a shoulder of a piston spacer and a shoulder of a pilot sleeve, the intermediate spring and piston spacer collectively biasing the pilot sleeve for contacting a shoulder of a pilot spring spacer disposed within the longitudinal chamber along the longitudinal axis and abutting the piston spacer, the pilot sleeve further configured to maintain contact with the shoulder of the pilot spring spacer when piston load pressures are less than the intermediate spring's biasing force; and a guide cap fixed to the longitudinal chamber, the guide cap defining a terminal chamber for receiving a portion of an adjusting screw, an adjusting nut, and a spring adjust spacer.

11. The counterbalance valve of claim 10, further comprising a cap seal having a first diameter, the cap seal forming a fluid seal between the guide cap and the valve body.

12. The counterbalance valve of claim 11, further comprising a second seal having a diameter smaller than the diameter of the cap seal, thereby creating a differential area.

\* \* \* \* \*